United States Patent [19]

Lewandowski

[11] 3,724,073
[45] Apr. 3, 1973

[54] ANNULAR CUTTER FOR TUBING
[75] Inventor: Stephen H. Lewandowski, Decatur, Mich.
[73] Assignee: Hamilton Alloy Products, Inc., Decatur, Mich.
[22] Filed: Mar. 10, 1971
[21] Appl. No.: 122,767

[52] U.S. Cl. ........................... 30/347, 30/95, 82/59
[51] Int. Cl. ............................................. B23d 21/04
[58] Field of Search ........................... 30/92–97, 347, 30/276; 82/59, 70.2–77; 83/199, 580, 646, 647.5

[56] References Cited

UNITED STATES PATENTS

| 98,294 | 12/1869 | Peace | 30/94 |
| 327,610 | 10/1885 | Stackpole | 83/199 |
| 1,657,295 | 1/1928 | Bark | 82/59 |
| 2,457,417 | 12/1948 | Trautmann | 30/92 |

Primary Examiner—Robert C. Riordon
Assistant Examiner—J. C. Peters
Attorney—Oltsch & Knoblock

[57] ABSTRACT

A cutter for tubing which is adapted for use in a machine which imparts circular-oscillative movement to the cutter. The cutter includes a bore through which the tubing is inserted and an annular V-shaped cutting part which protrudes into the bore and which, upon movement of the cutter, causes the tubing therein to be separated into selected lengths. The annular cutting part of the cutter is continuous and is defined by converging first and second faces each extending at an acute angle to the axis of the cutter bore.

4 Claims, 5 Drawing Figures

PATENTED APR 3 1973　　　　　　　　　　　3,724,073
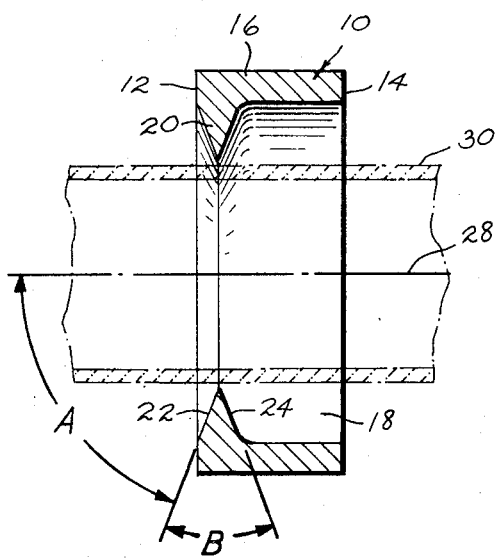
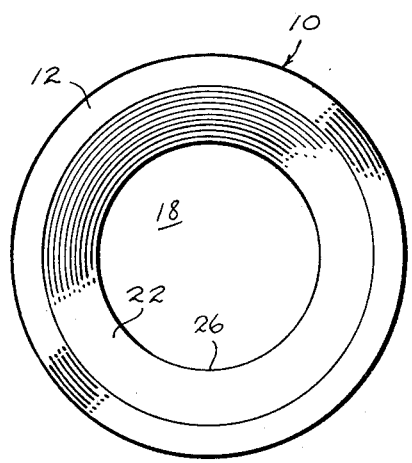
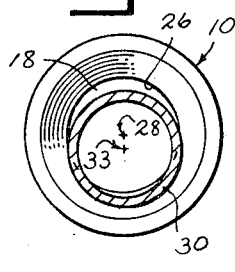
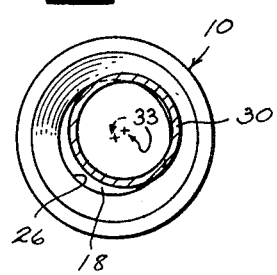
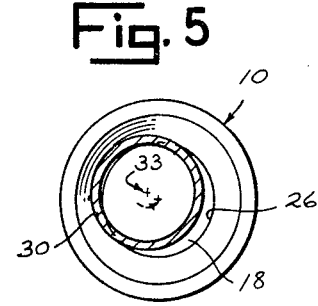
INVENTOR.
STEPHEN H. LEWANDOWSKI
BY Oltsch & Knoblock
ATTORNEYS

ANNULAR CUTTER FOR TUBING

BACKGROUND OF THE INVENTION

This invention relates to a cutter for thin-walled, light-gauge, small diameter tubing. Tubing of this nature is used in air conditioning and refrigeration apparatus and is commonly cut to selected lengths on a mass production basis by means of a cutting machine having one or more annular cutters which experience a shifting-circular cutting motion. Each cutter has a bore therethrough and includes an in-turned annular lip or cutting part which is positioned generally at the front face of the cutter and which defines a part of the bore. The annular lip forms the cutting edge of the cutter and heretofore has been defined by a beveled inner face extending to the cutter front face which is perpendicular to the axis of the cutter bore. Upon circular movement of the cutter the lip is caused to cut through the side wall of a tube which is inserted into the cutter bore and thereby separates the tube into sections of selected lengths. The circular cutting action of the cutter is necessary so that the tube can be sectioned without a burr or an internal rib being formed at the place of separation of the tube sections.

By having the annular cutting lip of the cutter formed with an outer face which is perpendicular to the cutter bore and an inner face which is inclined to the axis of the bore, it has been found that during use of the cutter the cutting edge of the lip quickly dulls, thus resulting in a short useful cutter life and the necessity of frequent replacement of the cutter. In this invention, the cutting part of the cutter is of an improved design which extends the useful life of the cutter.

SUMMARY OF THE INVENTION

The tube cutter of this invention includes a body part having front and rear faces and a bore therethrough which extends from the front face to the rear face of the body part. The cutter body part is adapted for securement to a machine which imparts a shifting-circular movement to the body part. The bore of the cutter is defined, preferably at the front face thereof, by an annular, continuous cutting part which is V-shaped in cross section and which includes first and second convergent faces defining the cutting edge of the cutter. Each face of the cutting part extends at an acute angle to the axis of the cutter bore with the included angle between the faces being approximately 40°. By so designing the cutter with such a V-shaped cutting part, it has been found that the cutter retains its sharpness for a longer period of time than the aforedescribed cutters of the prior art and thus requires less frequent replacement.

Accordingly, it is an object of this invention to provide a tube cutter which is of economical construction and of long productive life.

Still another object of this invention is to provide a cutter for severing thin-walled, light-gauge tubing formed of ferrous and non-ferrous materials into selected lengths.

Still another object of this invention is to provide a cutter for thin-walled, light-gauge tubing having an improved cutting edge which lengthens the useful life of the cutter.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is an axial sectional view of the cutter with a tube illustrated in broken lines inserted therein.

FIG. 2 is a front face view of the cutter as viewed from the left of FIG. 1.

FIG. 3 is a front face view of the cutter of FIG. 1 shown in a first cutting position.

FIG. 4 is a front face view of the cutter of FIG. 1 shown in a sequential cutting position.

FIG. 5 is a front face view of the cutter of FIG. 1 shown in a second sequential cutting position.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The preferred embodiment of the cutter includes a body part 10 having a front end face 12, rear end face 14, and a side wall 16 which cooperate to define a bore 18 therein. Body part 10 may be constructed of a high carbon steel which is suitable for cutting tubing formed of a variety of materials, such as stainless steel, aluminum, copper, and plastics. Body part 10 of the cutter includes an annular, inwardly projecting cutting part 20 which is illustrated as a lip located adjacent front face 12 of the cutter. Cutting part 20 is of a V-shape and is defined by converging faces 22 and 24 which join to define a continuous annular cutting edge 26. Both faces 22 and 24 extend at acute angles to the axis 28 of bore 18. Face 22 of cutting part 20 extends at a 67° to 73° angle, designed by the letter A in FIG. 1, to the axis 28 of bore 18. The included angle, designated by the letter B in FIG. 1, between faces 22 and 24 of the cutting part is 39° to 41°. In constructing the cutter shown in FIG. 1, angles A and B are preferably 70° and 40° respectively.

Body part 10 of the cutter is secured by suitable, well known means to a cutting machine which imparts circular movement to the cutter about a fixed axis 33, as shown sequentially in FIGS. 3–5. During movement of the cutter, body part 10 preferably does not rotate about its bore axis 28. Referring to FIGS. 3–5, in operation tube 30 is inserted into bore 18 and held stationary therein by suitable, well known anchoring means with its axis coinciding with fixed cutter axis 33. The cutter is moved in a circular direction about axis 33 which parallels axis 28 of cutter bore 18 causing cutting edge 26 to cut into the side wall of the tube, as shown in FIGS. 3–5, to separate the tube into sections. In FIGS. 4 and 5, the sequential position and movement of bore axis 28 is designated by the broken line arrows.

It is to be understood that the invention is not to be limited to the details herein given but may be modified within the scope of the appended claims.

What I claim is:

1. A cutter for tubing comprising a body part having a bore therethrough, said body part adapted for securement in a machine which imparts circular movement to the body part about an axis generally paralleling the axis of said bore, the wall of said bore being interrupted by an annular inwardly projecting cutting part, said cutting part being V-shaped in cross section and defined by first and second converging side faces, each side face extending at an angle from 67° to 73° to the axis of said bore, said side faces having an included angle from 39° to 41° therebetween.

2. A cutter for tubing comprising a body part having front and rear faces and a bore therethrough extending from said front face to said rear face, said body part adapted for securement to a machine which imparts circular movement to said body part about an axis paralleling the axis of said bore, said bore being defined at said front face by an in-turned annular continuous lip, said lip being V-shaped in cross section and having first and second convergent side faces defining a tubing-cutting edge, each side face extending at an acute angle to the axis of said bore, said side faces having an included angle of approximately 40 degrees therebetween.

3. The cutter of claim 2 wherein one of said ide faces extends at an angle from 67° to 73° to the axis of said bore and at an angle from 39° to 41° to the remaining side face.

4. A cutter for tubing comprising a body part having front and rear end faces and a tube-receiving bore therethrough extending from said front end face to said rear end face, said body part including an in-turned annular lip defining a portion of said bore at said front end face, said lip being V-shaped and having inner and outer converging faces defining a tube-cutting edge, said outer lip face extending inwardly into said bore from said front end face at an angle between 67° and 73° to the axis of said bore, said inner lip face extending at an angle between 39 and 4_ degrees to said outer lip face.

* * * * *